United States Patent [19]

Greenwood et al.

[11] 4,124,346
[45] Nov. 7, 1978

[54] EXTRUDER DIE ARRANGEMENT

[75] Inventors: Alan Greenwood, Kent, Ohio; Tim W. Doss, Union City, Tenn.

[73] Assignee: The Goodyear Tire & Rubber Company, Akron, Ohio

[21] Appl. No.: 814,751

[22] Filed: Jul. 11, 1977

Related U.S. Application Data

[63] Continuation of Ser. No. 674,457, Apr. 7, 1976, abandoned.

[51] Int. Cl.² .............................................. B29F 3/04
[52] U.S. Cl. ............................... 425/188; 425/192 R; 425/461
[58] Field of Search .................... 264/176 R; 425/188, 425/190, 191, 192 R, 376 R, 461; 72/253 R, 272

[56] References Cited

U.S. PATENT DOCUMENTS

| 2,449,625 | 9/1948 | Stuart | 425/188 |
| 2,807,833 | 10/1957 | Schanz | 425/192 X |

Primary Examiner—Francis S. Husar
Assistant Examiner—Mark Rosenbaum
Attorney, Agent, or Firm—R. S. Washburn

[57] ABSTRACT

A die clamp fixing an extruder final product profile die is secured relative to an extruder die head vertical front face and conveniently removed or interchanged. The die clamp swings about a horizontal pin to a horizontal position where the final die can be lifted freely from or placed on the clamp. The arrangement provides for a flow distributing insert readily removed or interchanged in like manner.

2 Claims, 4 Drawing Figures

EXTRUDER DIE ARRANGEMENT

This is a Continuation, of application Ser. No. 674,457 filed Apr. 7, 1976, now abandoned.

The foregoing abstract is not to be taken as limiting the invention of this application, and in order to understand the full nature and extent of the technical disclosure of this application, reference must be made to the accompanying drawing and the following detailed description.

The present invention relates to extrusion, particularly extrusion of thermoplastic materials and more particularly to extrusion of rubber and rubber-like strip components of tires.

A wide variety of thermoplastic materials are extruded to form strips of indefinite running length having prescribed cross-section profiles which profiles are dictated by the particular product.

To achieve the desired profile of a particular extruded product, the final die used in an extruder head provides an opening which is a replica of the cross-section of the product. The nature of the compound to be extruded to form one product may differ greatly from the nature of a compound to be extruded for a different product even though the cross-sectional shape of the two products are alike. It is known to modify the profile of a final die to compensate for extrusion phenomena such as swelling of the product or shrinkage of the product which takes place after the product exits from the final die.

However, heretofore, it has been difficult and expensive to adjust a final die to compensate for differences in the properties of the compound being extruded which properties affect the flow distribution pattern of the extrudate moving from the extruder itself, which is normally round, through the die head in which the flow is transformed from a circular cross-section to a cross-section of relatively small height and relatively much greater width. Such die heads are well known in the related arts and are in common use.

Additionally, in order to make maximum economic use of an extruder, it is desirable that the final die be capable of rapid and easy change to accommodate a variety of extruded products, but it is not normally desired to change the die head.

A principal object of the invention is to provide a method and apparatus for conveniently changing the flow distribution pattern of an extrudate upstream of the final die without changing the die head itself.

A further object of the invention is to provide a method of and apparatus for facilitating interchange of the final profiling die in an extruder head.

Briefly stated, the foregoing objects and others which will become apparent are accomplished in accordance with the invention, in a method of altering the flow distribution pattern of extrudate prior to its extrusion through a final die which die defines the cross-section shape of the product extruded and wherein the improvement comprises providing a die clamp for locating the final die with respect to the flow of extrudate, which clamp accommodates a removable flow distributing insert having a workable surface exposed to said flow under pressure upstream from said final die, placing the insert in the clamp, extruding a length of said product and inspecting the product exiting from the final die, and removing said insert and reworking its workable surface to alter the flow distribution pattern to diminish or remove deviations from the desired cross-section shape of the product.

According to a further aspect of the invention, there is provided a method of mounting extruder dies in an extruder which comprises connecting a die clamp to the extruder to swing about a horizontal axis between a vertical orientation for clamping a die to the extruder and a horizontal position supporting the die to be lifted freely therefrom and placed thereon.

Further, in accordance with the invention, there is provided an extruder die head adapted for mounting on an extruder, the die head having a flow passage therethrough and a front face, a die clamp releasably clamped against the front face of the die head and having an exit opening therethrough for extrudate, a recess in said clamp accommodating a final profile die for shaping the extruded product delivered through the exit opening, an insert holder having a slot formed transversely of the exit opening and having a plane surface exposed to extrudate under pressure, a flow distributing insert removably disposed in the slot and having an empirically determined surface flow distributing profile exposed to extrudate under pressure cooperating with the plane surface to form a channel for extrudate under pressure, the insert being clamped between the front face and the final profile die.

Further, to accomplish the objects in accordance with the invention, the die clamp is mounted on the die head to swing about a horizontal hinge axis spaced below the flow passage between an upright or vertical position against the front face and an open horizontal position, the die clamp having a recess accommodating a final profile forming die, and releasable fastening means for securing the die clamp in the upright position and for releasing the clamp to swing to its horizontal position.

To acquaint persons skilled in the most closely related arts with the principles of the invention, presently preferred embodiments illustrating the best modes now contemplated for practicing the invention are described hereinbelow, making reference to and including the attached drawings, in which.

Figure 1:
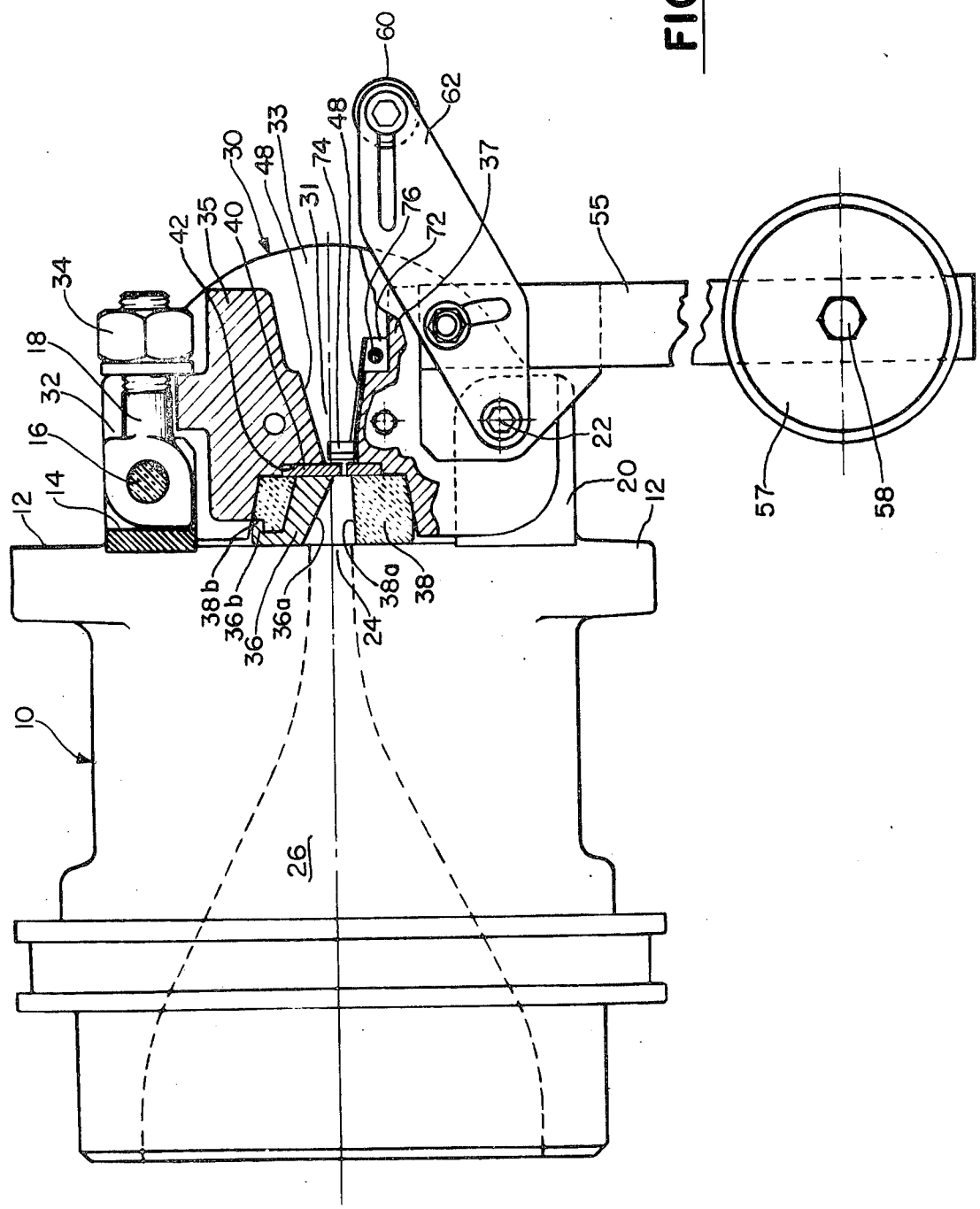
FIG. 1 is a side elevation view, partly in cross-section, illustrative of an apparatus in accordance with the invention.
Figure 3:
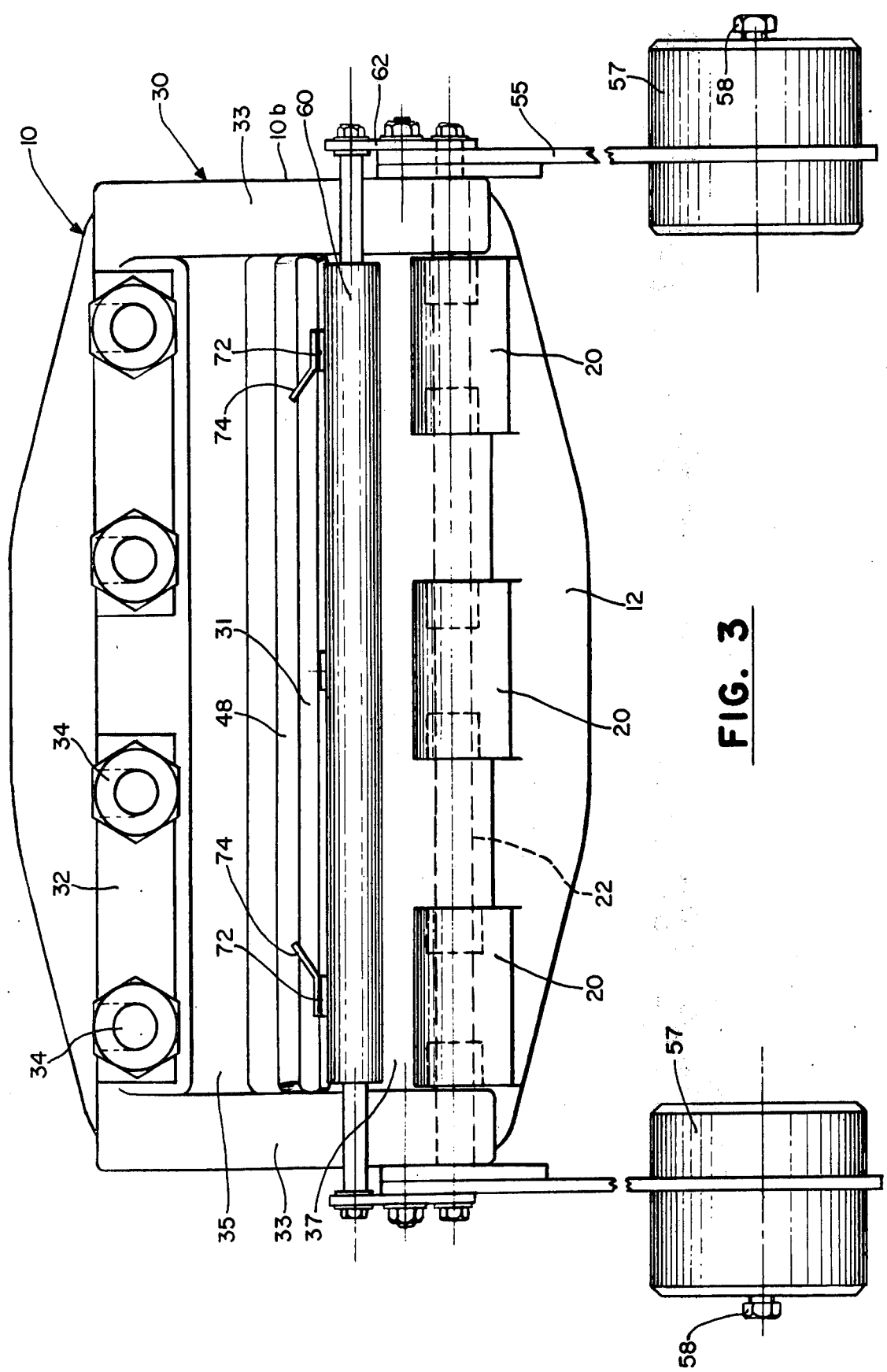
FIG. 3 is a front elevation view of the apparatus of FIG. 1.

An apparatus illustrative of certain principles of the invention may be seen in FIGS. 1 and 3. An extruder die head 10 is adapted to be mounted conventionally on a conventional extruder (not shown). Neither the die head 10 itself nor the extruder are themselves within the scope of the present invention, hence are not further described here, except for certain modifications thereto.

To the front face 12 of the die head are secured, as by welding, a plurality of lugs 14 which are bored to receive respectively a plurality of pins 16 extending through respective pairs of the lugs. Between each pair of lugs a swing bolt 18 is secured by the associated pin 16.

Also, to the face 12 of the die head a plurality of hinge lugs 20 are attached, as by welding. The hinge lugs are bored longitudinally to accommodate a hinge pin 22, the longitudinal axis of which is spaced forward from the front face and below the mouth 24, of the passage 26, in the die head. The arrangement serves as hinge means connecting the clamp to the die head, enabling the clamp to swing between its vertical position, holding a die in operative relation with the passage mouth and a horizontal position, illustrated in FIG. 2, open to expose the die for unobstructed removal from the apparatus.

The die clamp is a single unitary body by which a final die is held in operative relation with the mouth 24. The clamp, when in its vertical position, extends across the front face of the die head and provides an exit opening 31 therethrough for the extruded product exiting from the final die. The clamp 30 has, to minimize deflection relative to the face 12, an arched end portion 33 adjacent each side and a pair of deep beam portions 35, 37 extending between the end portions respectively above and below the exit opening 31.

A flange 32 extending upwardly and longitudinally of the clamp 30 along it upper portion is slotted to accommodate the swing bolts 18 and provides a clamp face against which the clamp nuts 34 can be tightened. The arrangement provides means for securing the clamp 30 in its vertical operating position to hold a die insert 36, a die insert holder 38, and a final die 40, snugly against each other and against the front face 12 of the die head 10 so as to minimize leakage of extrudate from its intended passage from the die head through the final die.

The final profile forming die 40 is retained in a recess 42 formed in the clamp 30. The recess 42 can extend the whole width of the clamp, opening outwardly at the respective sides 10a, 10b of the clamp or be closed at one or both ends of the longitudinally extending rectangular section seen in FIGS. 1 and 3. The recess 42 is provided with commonly used means 44 for preventing the incorrect insertion of the final die. The final die opening 45 which forms the desired cross-section of the extruded product is aligned with the exit opening 31 the walls 48 of which diverge away from the final die opening 45.

The clamp 30 has a seat 50 of trapezoidal cross-section extending from and opening outwardly at each side 10a to side 10b of the clamp. The shorter base 50' of the trapezoidal section is coplanar with the surface of a final die 40 disposed in the recess 42. The slant sides 50" of the seat are sloped sufficiently to allow the insert holder 38 to be placed in the seat manually and removed therefrom while the clamp is open, unobstructed by any additional fastening means, yet be held securely in position against the front face of the die head by the clamp when the latter is in its vertical position as well as during movements of the clamp between the two positions.

Figure 2:
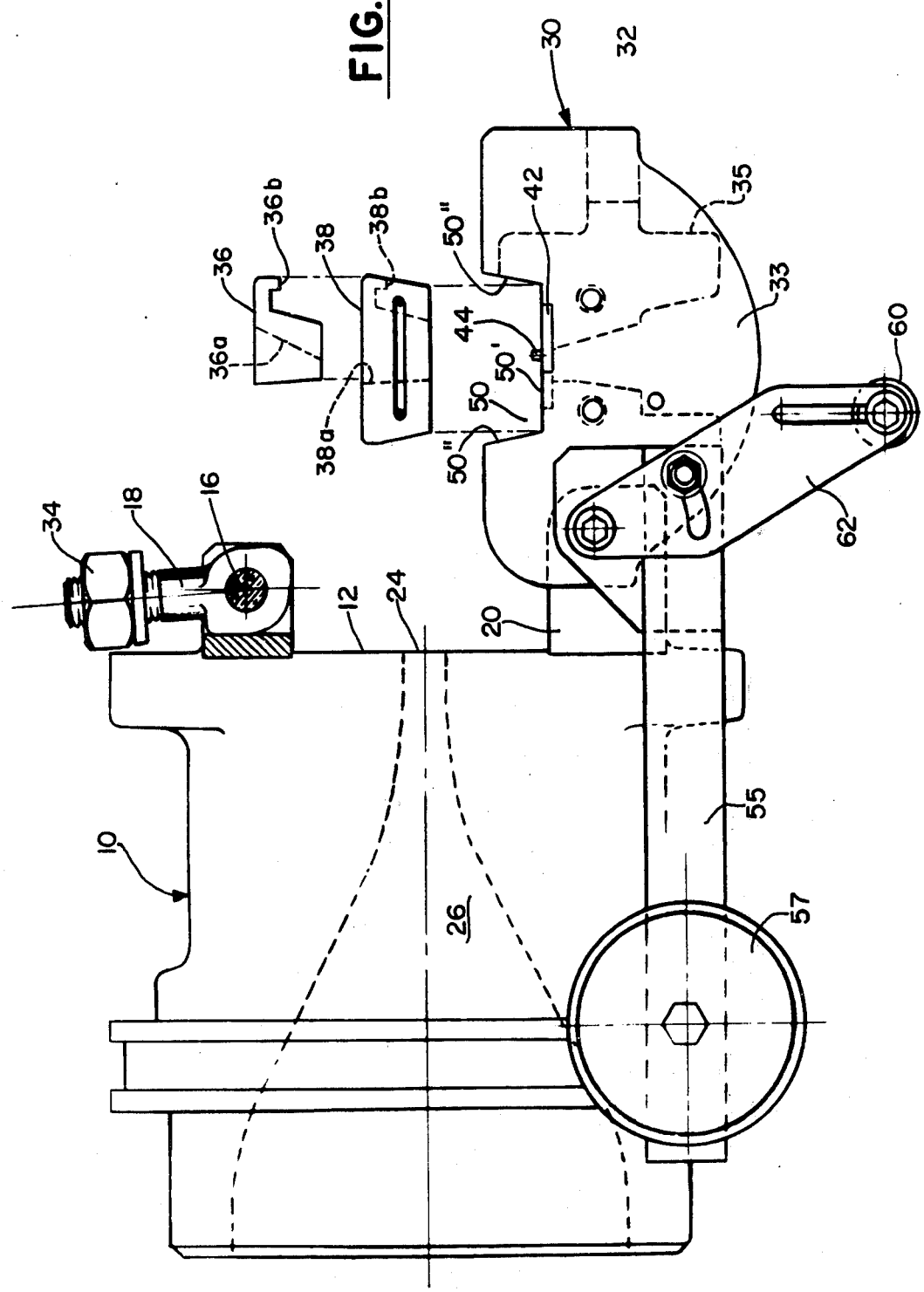
FIG. 2 is a partial side elevation view of the apparatus of FIG. 1 illustrating certain features of the invention.

In order to facilitate swinging the clamp 30 between its vertical position as seen in FIG. 1 and its horizontal position as seen in FIG. 2, a counterweight arm 55 is secured rigidly to each side of the clamp and carries a slotted counterweight 57 which is clamped to the arm at a suitable radial distance from the pin 22 to balance at least approximately the moment of the clamp itself about the pin. The counterweight is secured to the arm in the selected radial location by a screw 58. A roll 60 which, in operation of the extruder, supports the extruded product in its travel to a conveyor or the like from the final die can also conveniently serve as a handle assisting an operator in swinging the clamp between its vertical and horizontal positions. The roll is mounted rotatably in a pair of brackets 62 secured to the respective sides of the clamp and which brackets provide for adjustment of the roll location toward and away from the final die as well as in elevation with respect to the exit opening.

In accordance with the invention, the insert holder 38 accommodates a flow distributing insert 36 which has a surface 36a exposed to the extrudate under pressure upstream of the final die. The holder 38 provides a plane surface 38a likewise exposed to the extrudate. The surface 36a is defined herein as being workable, particularly to describe a surface which can be readily altered in profile both transversely and longitudinally of the flow of extrudate independently of the flow passage 26 of the die head itself and, as discussed hereinabove, independently of the final die 40. According to the invention, the flow distribution insert 36 can be quickly and easily removed from the clamp and from the insert holder, the workable surface 36a, then being exposed for alteration by conventional machining, by addition of metal thereto as by brazing or welding or even by hand grinding. The object of changing the profile or contour of the surface 36a is to change the flow pattern such that, for example, more extrudate is crowded toward the ends of the final die opening relative to the amount moving toward the opening between the ends. As another example, the surface can be modified to deliver greater quantities of extrudate to portions of the die opening greater in height (thickness) relative to flow at portions of the die opening of lesser height. Heretofore, as previously mentioned, the final die could be altered only to a very limited degree and no satisfactory alternative to a modification of the die head itself was available. The latter correction is not only expensive but practicably unavailable for routine changes from one extruded product to another.

The flow distribution insert 36 is provided with a surface sealingly engageable with the front face of the die head and a second and parallel surface engageable in coplanar sealing relation with the die insert 40 disposed in the recess 42 of the clamp.

The insert 36 is retained in the insert holder 38 solely by gravity without additional fastening means, by a longitudinally extending lip 36b which extends into a groove 38b formed in the holder. With the clamp in its horizontal position, FIG. 2, the insert holder 38 can be simply lifted from the clamp 30 and replaced or interchanged therein.

To trim an edge or edges of the extruded product, when desired, a pair of knife holders 72 are disposed adjacent a wall 48 of the opening 31. Each holder carries a trim knife 74 disposed close to the final die 40. An adjustment shaft 76 supporting the knife holders 72 extends through each of the end portions 33. The shaft is threaded, with opposite lead threads, as are the knife holders, so that by rotating the shaft the trim knives are moved equally and oppositely relative to the edges of the extruded product.

Figure 4:
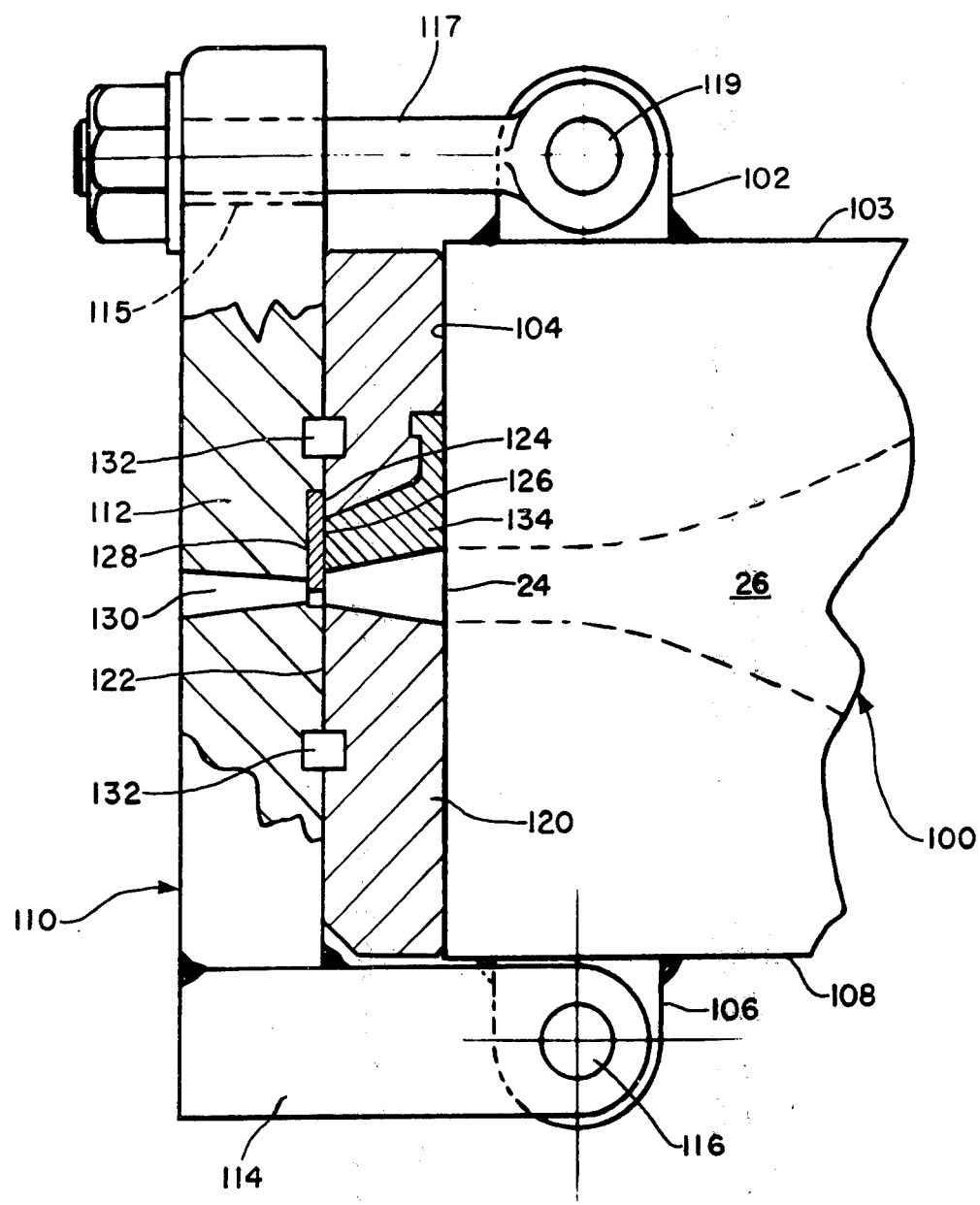
FIG. 4 is a side elevation view, partly in cross-section of another embodiment of the invention.

A further embodiment of the invention is illustrated in FIG. 4. A conventional die head 100 has a plurality of bolt lugs 102 affixed, as by welding, upon a top surface 103 immediately adjacent the front face 104 and a plurality of hinge lugs 106 welded along the lower horizontal surface 108 adjacent the front face. The clamp 110 is formed of a vertical plate 112 having hinge bars 114 extending horizontally from the lower edge of the plate. Slots 115 formed in the plate 112 accommodate swing bolts 117 carried by pins 119 fitted in the lugs 102 to secure the clamp 110 in its vertical, closed position. Hinge means for swinging the clamp between its vertical position and its horizontal position are provided by the bars 114, the lugs 106, and the hinge pin 116.

An insert holder 120 has a surface 112 disposed in coplanar relation with the surface 124 of the clamp and particularly in coplanar relation with the surface of the final profile die 126 in the recess 128 of the clamp adjacent the exit opening 130 for the extruded product. The insert holder 120 is located on the clamp by means of a pair of longitudinal horizontally extending keys 132 which are received in key grooves respectively in the clamp and in the holder. The arrangement provides that the insert holder is retained by the clamp solely by gravity when the clamp is moved between its vertical position as shown, and its horizontal position, in which position the insert holder 120 and/or the flow distributing insert 134 can readily be removed manually free of any fastening means. The flow distribution insert 134 is identical in all respects with the flow distribution insert 36 described in connection with FIGS. 1 and 2. Likewise, the final profile forming die 126 is exactly like the die 40 described in connection with the FIGS. 1 and 2.

Operation of the apparatus will have become clear to persons skilled in the related arts from the foregoing description. The advantages provided by the ability readily to remove and replace not only the final die but also the flow distribution insert without resort to tools, or to long delays will be apparent. Moreover, the provision of the flow distribution insert provides a more simple and less costly way to adjust the flow to and, therefore, through the final die than heretofore.

In the arrangement described with reference to FIGS. 1-3, as well as in the arrangement described with reference to FIG. 4, the clamp is closed, and secured in its closed position, holding both the final die and the flow distributing insert snugly in operative relation with the front face of the die head. An extruded product is then extruded in a normal manner. The product is inspected and deficiencies, if any, in its cross-section profile or contour are noted. If, for example, the lateral edges of the product strip are not filled, the distributing insert can easily and quickly have its workable surface altered to change the flow distribution of the extrudate under pressure upstream from the final die. Alternatively, a spare insert can be suitably altered and quickly interchanged in the clamp. Neither the final die nor the die head thus require change.

While certain representative embodiments and details have been shown for the purpose of illustrating the invention, it will be apparent to those skilled in the art that various changes and modifications may be made therein without departing from the spirit or scope of the invention.

What is claimed is:

1. An extruder die arrangement comprising a die head having a vertical front face and a single passage for converting flow from a single extruder barrel to a flow of cross-section of smaller height and greater width; a final profile die for forming a desired cross-section profile in the extruded product; and flow distribution means comprising a single elongated bar insert extending continuously in a direction of said greater width and having a workable surface exposed throughout its longitudinal extent to extrudate under pressure thereby changing the flow distribution pattern of extrudate issuing from said passage prior to its entry into the final die and independently of said final die; clamp means consisting of a single unitary member having a seat of trapezoidal cross-section extending horizontally from side to side thereof to accommodate said flow distribution means, a longitudinally extending recess positioning said final die, and an opening through said member accommodating movement of the extruded product in its desired cross-section profile freely outward from said profile die; and hinge means connecting said member to the die head to swing between a closed position securing said profile die outwardly between said member and said vertical face and an open horizontal position having both said distributing means and profile die retained therein only by their own weight and whence said flow distributing means can be freely lifted upwardly from said profile die and said member.

2. Apparatus as claimed in claim 1, and an insert holder having a slot accommodating said insert therein and a surface opposite said workable surface exposed to extrudate under pressure between said passage and said final die.

* * * * *